United States Patent
Zhang et al.

(10) Patent No.: US 9,545,929 B1
(45) Date of Patent: Jan. 17, 2017

(54) METHOD AND APPARATUS TO CONTROL A CONTINUOUSLY VARIABLE TRANSMISSION

(71) Applicant: GM GLOBAL TECHNOLOGY OPERATIONS LLC, Detroit, MI (US)

(72) Inventors: Zhen J. Zhang, West Bloomfield, MI (US); Paul G. Otanez, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/886,368

(22) Filed: Oct. 19, 2015

(51) Int. Cl.
| | | |
|---|---|---|
| *B60W 30/188* | (2012.01) | |
| *F16H 61/662* | (2006.01) | |
| *B60W 10/06* | (2006.01) | |
| *B60W 10/107* | (2012.01) | |
| *B60W 10/02* | (2006.01) | |
| *F16H 59/70* | (2006.01) | |

(52) U.S. Cl.
CPC .......... *B60W 30/188* (2013.01); *B60W 10/026* (2013.01); *B60W 10/06* (2013.01); *B60W 10/107* (2013.01); *F16H 61/66272* (2013.01); *B60W 2510/0275* (2013.01); *B60W 2540/10* (2013.01); *B60W 2710/024* (2013.01); *B60W 2710/0666* (2013.01); *B60W 2710/1005* (2013.01); *B60W 2710/1083* (2013.01); *F16H 2059/704* (2013.01)

(58) Field of Classification Search
None
See application file for complete search history.

(56) References Cited

U.S. PATENT DOCUMENTS

| | | | | |
|---|---|---|---|---|
| 5,976,054 A | * | 11/1999 | Yasuoka | B60W 10/06 477/109 |
| 6,080,080 A | * | 6/2000 | Bolz | B60W 10/06 477/39 |
| 6,181,020 B1 | * | 1/2001 | Uchida | B60W 10/06 290/40 A |
| 2011/0118077 A1 | * | 5/2011 | Kawasaki | B60K 6/445 477/3 |
| 2012/0090937 A1 | | 4/2012 | Samie et al. | |
| 2013/0130863 A1 | | 5/2013 | Xu et al. | |
| 2014/0074366 A1 | | 3/2014 | Cui et al. | |
| 2015/0088391 A1 | * | 3/2015 | Ishikawa | B60W 10/06 701/54 |
| 2015/0239476 A1 | * | 8/2015 | Inoue | B60W 10/04 701/52 |

* cited by examiner

*Primary Examiner* — Justin Holmes
(74) *Attorney, Agent, or Firm* — Quinn Law Group, PLLC

(57) ABSTRACT

A powertrain system including an internal combustion engine rotatably coupled to a variator of a continuously variable transmission (CVT) is described. A method for controlling the CVT includes determining a desired variator speed ratio in response to a change in an operator input and executing a step-upshift in the CVT based upon the desired variator speed ratio. The step-upshift includes determining a preferred CVT input deceleration profile based upon the desired variator speed ratio, a present variator speed ratio, and a preferred shift time and synchronizing the preferred CVT input deceleration profile with a command to reduce engine torque. A change rate for the variator speed ratio is based upon the preferred CVT input deceleration profile, and the CVT is controlled in response to the change rate for the variator speed ratio and the desired variator speed ratio.

14 Claims, 2 Drawing Sheets

METHOD AND APPARATUS TO CONTROL A CONTINUOUSLY VARIABLE TRANSMISSION

TECHNICAL FIELD

This disclosure relates to a continuously variable transmission for a vehicle powertrain, and a method and control routine associated therewith.

BACKGROUND

Powertrains having an internal combustion engine coupled to a continuously or infinitely variable transmission (CVT) may be employed to provide tractive effort in vehicles. A CVT is capable of continuously changing an input/output speed ratio over a range between a minimum (underdrive) ratio and a maximum (overdrive) ratio, thus permitting infinitely variable selection of engine operation that achieves a preferred balance of fuel consumption and engine performance in response to an operator torque request.

Known chain-type continuously variable transmissions include two pulleys, each having two sheaves. A chain runs between the two pulleys, with the two sheaves of each of the pulleys sandwiching the chain therebetween. Frictional engagement between the sheaves of each pulley and the chain couples the chain to each of the pulleys to transfer torque from one pulley to the other. One of the pulleys may operate as a drive or input pulley and the other pulley may operate as a driven or output pulley. The gear ratio is the ratio of the torque of the driven pulley to the torque of the drive pulley. The gear ratio may be changed by urging the two sheaves of one of the pulleys closer together and the two sheaves of the other pulley farther apart, causing the chain to ride higher or lower on the respective pulley.

Known toroidal continuously variable transmissions include discs and roller mechanisms that transmit power between the discs. The toroidal continuously variable transmission includes at least one input disc, connected to the engine, and one output disc operatively connected to the transmission output. The input disc and output disc define a cavity therebetween. The cavity defines a toroidal surface. The roller mechanism is placed within the cavity and is configured to vary the torque transmission ratio as the roller mechanism moves across the toroidal surface.

SUMMARY

A powertrain system including an internal combustion engine rotatably coupled to a variator of a continuously variable transmission (CVT) is described. A method for controlling the CVT includes determining a desired variator speed ratio in response to a change in an operator input and executing a step-upshift in the CVT based upon the desired variator speed ratio. The step-upshift includes determining a preferred CVT input deceleration profile based upon the desired variator speed ratio, a present variator speed ratio, and a preferred shift time and synchronizing the preferred CVT input deceleration profile with a command to reduce engine torque. A change rate for the variator speed ratio is based upon the preferred CVT input deceleration profile, and the CVT is controlled in response to the change rate for the variator speed ratio and the desired variator speed ratio.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
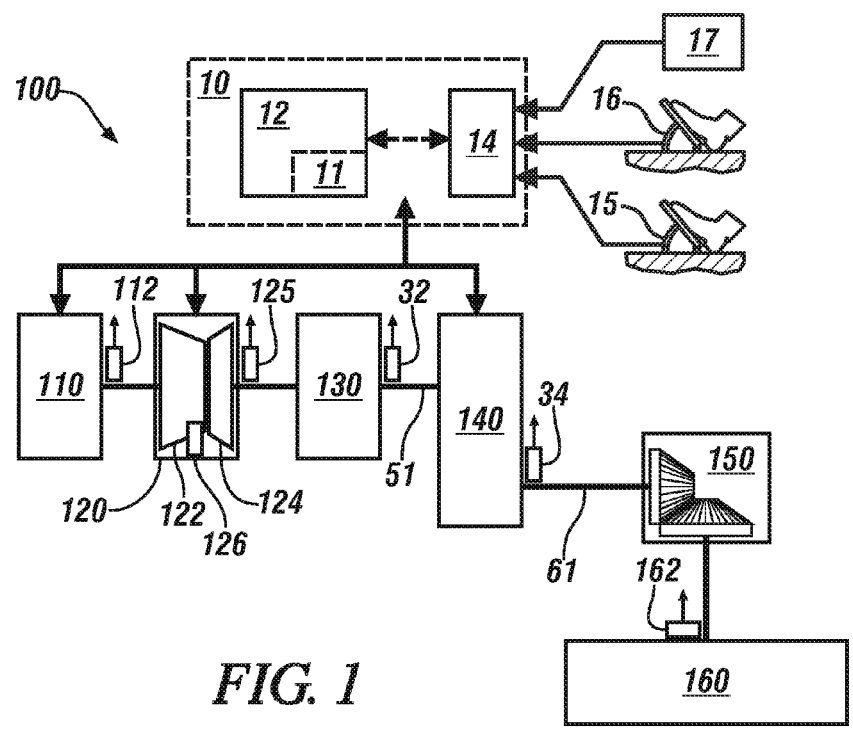
FIG. 1 schematically illustrates elements of a powertrain system that includes an internal combustion engine rotatably coupled to a continuously variable transmission (CVT) via a torque converter and a gear box, in accordance with the disclosure.

Referring now to the drawings, wherein the depictions are for the purpose of illustrating certain exemplary embodiments only and not for the purpose of limiting the same, FIG. 1 schematically illustrates elements of a powertrain system 100 that includes an internal combustion engine (engine) 110 rotatably coupled to a continuously variable transmission (CVT) 140 via a torque converter 120 and a gear box 130. The powertrain system 100 couples via a driveline 150 to a vehicle wheel 160 to provide tractive effort when employed on a vehicle. Operation of the powertrain system 100 is monitored by and controlled by a control system 10 in response to driver commands and other factors.

The engine 110 may be any suitable internal combustion engine capable of transforming hydrocarbon fuel to mechanical power to generate torque in response to commands originating from the control system 10. The torque converter 120 is a device providing fluidic coupling between its input and output members for transferring torque, and preferably includes a pump 122 that is coupled to the engine 110 and a turbine 124 that is coupled via the output member to the gear box 130. A torque converter clutch 126 locks rotation of the pump 122 and turbine 124 and is controllable by the control system 10. The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 includes an output member that rotatably couples to the CVT 140 via an input member 51. One embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gearset, a chain drive gearset or another suitable gear arrangement for transferring torque to one or more vehicle wheels 160.

The powertrain system 100 preferably includes one or more sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162, through which vehicle speed (Vss) is monitored. Each of the aforementioned speed sensors may be any suitable rotation position/speed sensing device, such as a Hall-effect sensor. Each of the aforementioned speed sensors communicates with the control system 10.

The control system 10 preferably includes one or a plurality of controllers 12 and a user interface 14. A single controller 12 is shown for ease of illustration. The controller 12 may include a plurality of controller devices wherein each of the controllers 12 is associated with monitoring and controlling a single system. This may include an engine control module (ECM) for controlling the engine 110 and a transmission controller (TCM) for controlling the CVT 140 and for monitoring and controlling a single subsystem, e.g., a torque converter clutch. The controller 12 preferably includes a memory device 11 containing executable instruction sets. The user interface 14 communicates with operator input devices including, e.g., an accelerator pedal 15, a brake pedal 16 and a transmission gear selector 17. In one embodiment, the transmission gear selector 17 includes a tap-up/tap-down feature, whereby a vehicle operator may manually select a transmission gear ratio and override transmission control. A tap-up command results in a command to the CVT 140 to decrease its gear ratio, which is accomplished by increasing a variator speed ratio. A tap-down command results in a command to the CVT 140 to increase its gear ratio by decreasing the variator speed ratio.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory components in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters, and regularly or periodically updating the states of the parameters during execution of a routine or between iterations of execution of the routine.

Figure 2:
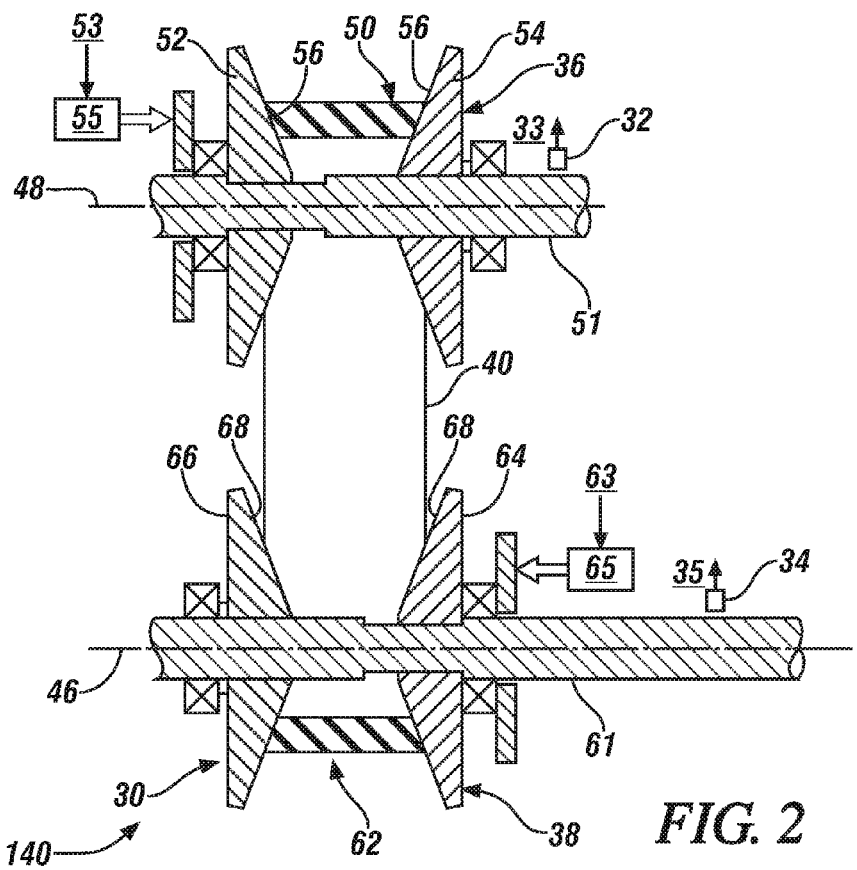
FIG. 2 schematically illustrates elements of a variator of a chain-type CVT, in accordance with the disclosure.

FIG. 2 schematically illustrates elements of a variator 30 of a chain-type continuously variable transmission (CVT) 140 that is advantageously controlled by a controller 12. The variator 30 transfers torque between the first rotating member 51 and the second rotating member 61. The first rotating member 51 is nominally referred to herein as input member 51, and the second rotating member 61 is nominally referred to herein as output member 61.

The variator 30 includes a first, or primary pulley 36, a second, or secondary pulley 38 and flexible continuous rotatable device 40 that rotatably couples the first and second pulleys 36, 38 to transfer torque therebetween. The first pulley 36 rotatably attaches to the input member 51 and the second pulley 38 rotatably attaches to the output member 61, and the rotatable device 40 is adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. The continuous rotatable device 40 can be a belt, a chain, or another suitable flexible continuous device.

The first pulley 36 is split perpendicular to the first axis 48 to define an annular first groove 50 that is formed between a moveable sheave 52 and a stationary sheave 54. The moveable sheave 52 axially moves or translates along the first axis 48 relative to the stationary sheave 54. For example, the moveable first sheave 52 may be attached to the input member 51 via a splined connection, thereby allowing axial movement of the moveable first sheave 52 along the first axis 48. The stationary first sheave 54 is disposed opposite the moveable first sheave 52. The stationary first sheave 54 is axially fixed to the input member 51 along the first axis 48. As such, the stationary first sheave 54 does not move in the axial direction of the first axis 48. The moveable first sheave 52 and the stationary first sheave 54 each include a first groove surface 56. The first groove surfaces 56 of the moveable first sheave 52 and the stationary first sheave 54 are disposed opposite each other to define the annular first groove 50 therebetween. The opposed first grooved surfaces 56 preferably form an inverted frustoconical shape such that a movement of the moveable first sheave 52 towards the stationary first sheave 54 increases an outer pulley diameter of the annular first groove 50. An actuator 55 is arranged with the first pulley 36 to control an axial position of the moveable first sheave 52 in response to a drive signal 53, including urging the moveable first sheave 52 towards the stationary first sheave 54. In one embodiment, the actuator 55 is a hydraulically-controlled device and the drive signal 53 is a hydraulic pressure signal.

The second pulley 38 is split perpendicular to the second axis 46 to define an annular second groove 62 therebetween. The annular second groove 62 is disposed perpendicular to the second axis 46. The second pulley 38 includes a moveable sheave 64 and a stationary sheave 66. The moveable sheave 64 axially moves or translates along the second axis 46 relative to the stationary sheave 66. For example, the moveable second sheave 64 may be attached to the output member 61 via a splined connection, thereby allowing axial movement of the moveable second sheave 64 along the second axis 46. The stationary second sheave 66 is disposed opposite the moveable second sheave 64. The stationary second sheave 66 is axially fixed to the output member 61 along the second axis 46. As such, the stationary second sheave 66 does not move in the axial direction of the second axis 46. The moveable second sheave 64 and the stationary second sheave 66 each include a second groove surface 68. The second groove surfaces 68 of the moveable second sheave 64 and the stationary second sheave 66 are disposed opposite each other to define the annular second groove 62 therebetween. The opposed second grooved surfaces 68 preferably form an inverted frustoconical shape such that a movement of the moveable second sheave 64 towards the stationary second sheave 66 increases an outer pulley diameter of the annular second groove 62. An actuator 65 is arranged with the second pulley 38 to control an axial position of the moveable second sheave 64 in response to a driven signal 63, including urging the moveable second sheave 64 towards the stationary second sheave 66. In one embodiment, the actuator 65 is a hydraulically-controlled device and the driven signal 63 is a hydraulic pressure signal. A ratio of the outer pulley diameter of the first pulley 36 and the outer pulley diameter of the second pulley 38 defines a transmission torque ratio. Other elements, such as clutch assemblies in the form of selectable one-way clutches and the like may be deployed between the variator 30 and other powertrain and driveline components and systems.

Various sensors are suitably positioned for sensing and providing signals related to operation of the CVT 140, including the CVT variator input speed sensor 32 and the CVT variator output speed sensor 34. The input speed sensor 32 may be mounted near the input member 51 to generate an input speed signal 33, and the CVT variator output speed sensor 34 may be mounted near the output member 61 to generate an output speed signal 35.

The variator speed ratio (VSR) is a ratio of the speed of the output member 61 in relation to the speed of the input member 51. Forms of the VSR may be employed as a control parameter for the CVT 140, including an actual VSR and a desired VSR. The actual VSR indicates a present, measured value for the VSR, and may be determined based upon a ratio of the input speed signal 33 and the output speed signal 35. The desired VSR indicates a commanded, future value for the VSR, which may be determined based upon monitored and estimated operating conditions related to an output power command, vehicle speed and engine torque. The controller 12 controls the CVT 140 to achieve the desired VSR by controlling pressures of one or both the primary pulley 36 and the secondary pulley 38 of the CVT 140. Controlling pressures of one or both the primary pulley 36 and the secondary pulley 38 of the CVT 140 can be achieved by controlling the drive and driven signals 53, 63 to apply requisite pressures to the first and second actuators 55, 65 to effect the desired VSR, wherein the requisite pressures are preferably in the form of a primary pressure command and a secondary pressure command.

Figure 3:
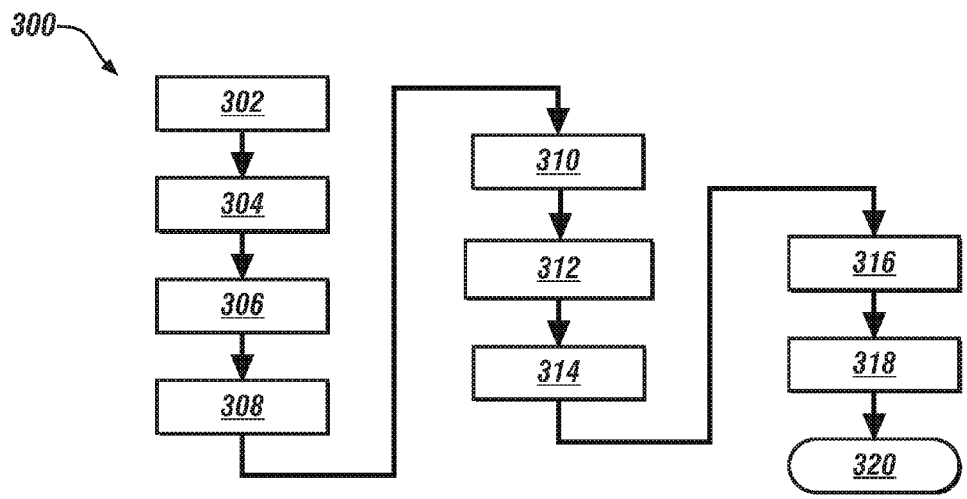
FIG. 3 schematically shows a block diagram of a CVT upshift control routine that can be employed in controlling an embodiment of the powertrain system including the CVT shown with reference to FIGS. 1 and 2 in response to a commanded step upshift, in accordance with the disclosure.

FIG. 3 schematically shows a block diagram of a CVT upshift control routine 300 that can be employed in controlling an embodiment of the CVT 140 and also controlling the powertrain system 100 shown with reference to FIGS. 1 and 2 in response to a commanded step upshift. A step upshift in the CVT 140 is analogous to an upshift in a fixed gear transmission, with controlling the CVT 140 to increase its actual VSR being functionally equivalent to controlling a fixed gear transmission to operate at a higher gear ratio. When a vehicle employing the powertrain system 100 is in motion, an increase in the actual VSR may cause decreases in the rotational speeds of the gear box 130, the elements of the torque converter 120, and the engine 110 due to vehicle momentum, which may affect drivability if the increase in the actual VSR occurs abruptly or too rapidly. The CVT upshift control routine 300 employs turbine speed deceleration (ratio change rate) and engine torque management to compensate for potential change in turbine input torque to provide an upshift event that includes managing output torque from the CVT 140 to the driveline 150 and minimizing occurrence of vehicle deceleration glitches. Table 1 is provided as a key wherein the numerically labeled blocks and the corresponding functions are set forth as follows, corresponding to the CVT upshift control routine 300.

TABLE 1

| BLOCK | BLOCK CONTENTS |
|---|---|
| 302 | Monitor Vss |
|  | Monitor operator inputs to APP, PRNDL |
| 304 | Determine desired VSR |
| 306 | Command step-upshift in response to the desired VSR |
| 308 | Unlock torque converter clutch |
| 310 | Determine a preferred CVT input deceleration profile |
| 312 | Synchronize preferred CVT input deceleration profile with an engine torque command |
| 314 | Calculate VSR change rate based upon the CVT input deceleration profile |
| 316 | Calculate shift force based upon VSR change rate |
| 318 | Control CVT primary pressure command and CVT secondary pressure command in response to the VSR change rate and the desired VSR |
| 320 | End |

The CVT upshift control routine (routine) 300 is described in terms of a CVT input speed and a CVT output speed, both which are preferably measured parameters that are input to the controller 12. The CVT input speed may be determined based upon a signal input from one of the engine speed sensor 112, the torque converter turbine speed sensor 125, or the CVT variator input speed sensor 32, as described herein, or another suitable rotational speed/position sensor. The CVT output speed may be determined based upon a signal input from the CVT variator output speed sensor 34 or the wheel speed sensor 162 as described herein, or another suitable rotational speed/position sensor. The VSR parameters are determined based upon the CVT input speed and the CVT output speed. As used herein, the term 'deceleration' refers to a decrease in speed of a rotating member or other element.

During ongoing operation of the powertrain system 100, the controller 12 periodically monitors the vehicle speed (Vss) via the wheel speed sensor 162 and the operator inputs via the accelerator pedal 15 and the transmission gear selector 17 (302) and controls operation of the powertrain system 100 at an initial VSR based upon the operator inputs and other factors related to operator expectations affecting drivability, performance and fuel consumption.

Upon detecting a change in the operator input, e.g., either a change in an operator tip-in to the accelerator pedal 15 (APP), or an operator tap-up input to the transmission gear selector 17 (PRNDL) requesting a step-upshift, the routine 300 determines a desired VSR for the CVT 140 based upon the change(s) in the operator input(s) and other factors related to operator expectations affecting drivability, performance and fuel consumption (304). This may include a command to execute the step-upshift in the speed ratio in response to the desired VSR for the CVT 140 and the change(s) in the operator input(s) (306).

In response to a command to execute a step-upshift in the CVT 140, the torque converter clutch 126 is unlocked if presently in a locked state (308).

To execute the step-upshift in the CVT 140 without affecting drivability, the routine 300 determines a preferred CVT input deceleration profile based upon the desired VSR, an initial CVT input speed and a target CVT input speed (310). One embodiment of a preferred CVT input deceleration profile is described with reference to FIG. 4.

Figure 4:
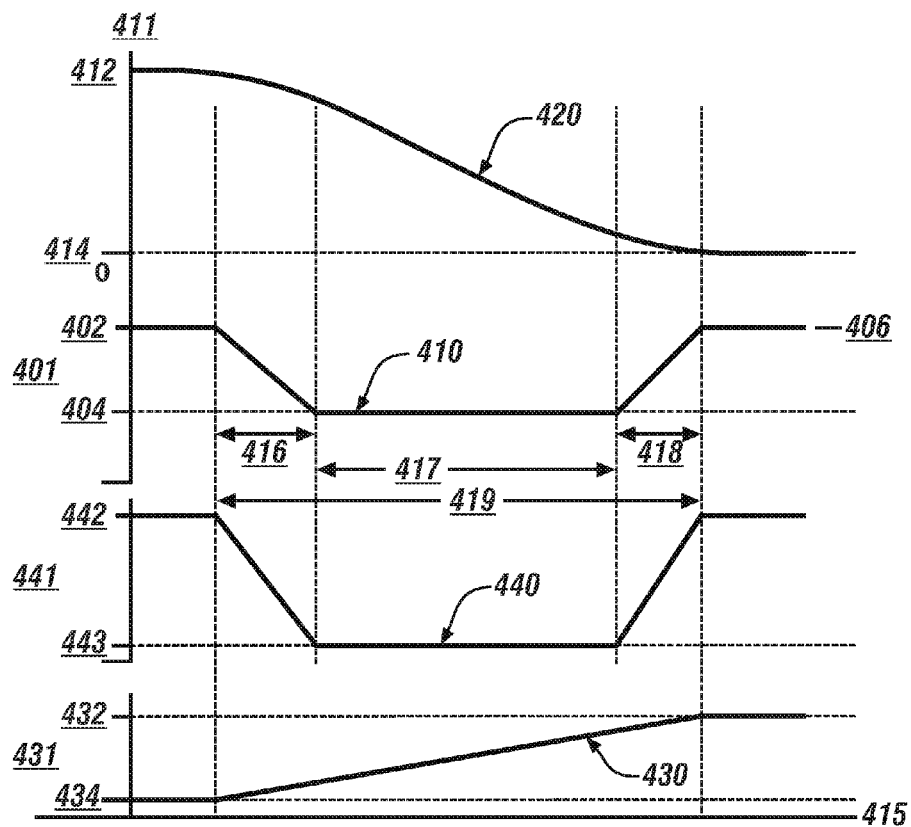
FIG. 4 graphically shows one embodiment of a preferred CVT input deceleration profile and associated desired speed profile, in accordance with the disclosure.

FIG. 4 graphically shows one embodiment of a calibration graph of a CVT input deceleration profile 410 shown with reference to a CVT input deceleration axis (rad/s$^2$) 401, an associated desired CVT input speed profile 420 shown with reference to a CVT input speed (rad/s) axis 411, an associated engine torque command profile 440 shown with reference to an engine torque axis 441, and a corresponding VSR 430 shown with reference to a VSR axis 431, all plotted in relation to time (sec) 415, which is shown on the horizontal axis. The initial VSR 434, the desired VSR 432, the initial engine torque 442, and the initial CVT input speed 412 are known, along with a total preferred shift time 419, and these values are employed to calculate the CVT input deceleration profile 410. The CVT input deceleration profile 410 preferably has several parameters, including an initial CVT input deceleration 402, a maximum CVT input deceleration 404 and a final CVT input deceleration, an initial-to-maximum CVT input deceleration time 416, a maximum CVT input deceleration time 417, and a maximum-to-final CVT input deceleration time 418. The engine torque command profile 440 includes the initial engine torque 442 and a steady-state engine torque command 443. The aforementioned parameters are calculated or otherwise determined to achieve the desired VSR 434 within the total preferred shift time 419 when starting at the initial VSR 434. In one embodiment, the CVT input speed and CVT input deceleration are associated with speed and deceleration measured at the turbine 124 of the torque converter 120. Alternatively, the CVT input speed and CVT input deceleration may be based upon the input speed signal 33 to the variator 30 of the CVT 140. In one embodiment, the maximum CVT input deceleration 404 is defined based upon its effect on vehicle operation, specifically on vehicle acceleration or deceleration. The target input speed is determined by multiplying the desired VSR 432 and the present output speed. The maximum CVT input deceleration 404 is determined based upon the initial input speed, the target input speed, and the total preferred shift time 419. The initial CVT input deceleration 402 and the final CVT input deceleration 406 are transition decelerations that are calibrated to avoid abrupt changes in the CVT input speed 414 that may be disruptive to vehicle operation.

A decrease in the engine torque or a decrease in engine speed may be determined in relation to the CVT input deceleration profile 410 and the transmission CVT input inertia, and indicates an amount of necessary engine torque decrease to effect operation. When the torque converter clutch 126 is locked, the CVT input inertia is the sum of the crankshaft and turbine inertias. When the torque converter clutch 126 is unlocked and the torque converter is slipping, the engine and turbine speed difference is based upon the magnitude of the torque converter clutch slip. The inertia calculation uses torque converter K-factor characteristics to predict engine speed change. The predicted engine speed change is employed to calculate engine deceleration and the resulting crankshaft deceleration, i.e., the inertial torque is related to the torque converter operating point, the CVT input deceleration profile and a torque converter speed ratio. When the CVT input speed approaches the target CVT input speed, less CVT input torque is required to follow the CVT input profile.

Referring again to FIG. 3, the operator inputs to the accelerator pedal 15 (APP) and the transmission gear selector 17 (PRNDL) are evaluated and the control routine 300 controls the engine 110 and the CVT 140 to synchronize the CVT input deceleration profile 410 described with reference to FIG. 4 with an engine torque command that includes a command to decrease the engine torque (312), including calculating a VSR change rate based upon the CVT input deceleration profile 410 (314). The command to decrease engine torque may be communicated as an engine torque request from the TCM to the ECM, and may introduce a delay associated with communication and control lag times. The ECM can adjust the engine torque based on the engine torque request, with the associated delay between the engine torque request and the subsequent engine torque response. A shift time delay is introduced to synchronize the shift command, i.e., the desired VSR, the turbine speed change, i.e., the CVT input deceleration profile 410, the inertia torque calculation and the engine torque request. This shift time delay is equal to the sum of communication lag times between the ECM and the TCM, and an engine torque response time lag. Calculating the engine torque increase or decrease that is required to eliminate the turbine input torque drop may also be used to determine the minimum pulley clamping force.

The control routine 300 calculates a shift force based upon the VSR change rate (316) and controls the CVT primary pressure command and the CVT secondary pressure command in response to the VSR change rate and the desired VSR (318). This includes controlling a primary pressure command to the primary pulley 36 and/or controlling a secondary pressure command to the secondary pulley 38 of the CVT 140. This may include the controller 12 sending first and second signals 53, 63 to drive the first and second actuators 55, 65 based thereon to move the moveable sheave 52 of the first pulley 36 and the moveable sheave 64 of the second pulley 38 as described above. This movement causes a change in torque transfer across the variator 30 of the CVT 140. The control routine 300 ends when the desired VSR is achieved (320).

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instructions to implement the function or act specified in the flowchart.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a continuously variable transmission (CVT) of a powertrain system including an internal combustion engine coupled to an input member of the CVT, the method comprising:
   determining a desired variator speed ratio in response to a change in an operator input; and
   executing a step-upshift based upon the desired variator speed ratio, the step-upshift including:
      determining a preferred CVT input deceleration profile based upon the desired variator speed ratio, a present variator speed ratio, and a preferred shift time,
      synchronizing the preferred CVT input deceleration profile with a command to decrease engine torque,
      determining a change rate for the variator speed ratio based upon the preferred CVT input deceleration profile, and
      controlling the CVT in response to the change rate for the variator speed ratio and the desired variator speed ratio.

2. The method of claim 1, wherein determining the desired variator speed ratio in response to a change in an operator input comprises determining an increased variator speed ratio in response to an operator tip-in to an accelerator pedal.

3. The method of claim 1, wherein determining the desired variator speed ratio in response to a change in an operator input comprises determining an increased variator speed ratio in response to an operator tap-up input to a transmission gear selector requesting a step-upshift.

4. The method of claim 1, wherein controlling the CVT in response to the change rate for the variator speed ratio and the desired variator speed ratio comprises controlling a primary pressure command to drive an actuator of a moveable sheave of a primary pulley of a variator of the CVT in response to the change rate for the variator speed ratio and the desired variator speed ratio.

5. The method of claim 1, wherein controlling the CVT in response to the change rate for the variator speed ratio and the desired variator speed ratio comprises controlling a secondary pressure command to drive an actuator of a moveable sheave of a secondary pulley of a variator of the CVT in response to the change rate for the variator speed ratio and the desired variator speed ratio.

6. The method of claim 1, wherein the preferred CVT input deceleration profile comprises an initial CVT input deceleration, a maximum CVT input deceleration and a final CVT input deceleration, an initial-to-maximum CVT input deceleration time, a maximum CVT input deceleration time, and a maximum-to-final CVT input deceleration time that are determined to achieve the desired variator speed ratio within the preferred shift time when starting at an initial variator speed ratio.

7. A method for controlling a powertrain system including an internal combustion engine rotatably coupled to a variator of a continuously variable transmission (CVT) via a torque converter, the method comprising:
   determining a desired variator speed ratio responsive to an operator input;
   determining parameters for executing a step-upshift in the CVT based upon the desired variator speed ratio, including:
      determining a desired CVT input speed profile and a preferred CVT input deceleration profile based upon the desired variator speed ratio, an initial CVT input speed and a target CVT input speed,
      synchronizing the preferred CVT input deceleration profile with a command to decrease engine torque, and
      determining a change rate for the variator speed ratio based upon the preferred CVT input deceleration profile synchronized with the engine torque command; and
   executing the step-upshift in the CVT based upon the desired variator speed ratio, including:
      controlling the CVT in response to the change rate for the variator speed ratio and the desired variator speed ratio, and
      controlling the internal combustion engine in response to the command to decrease engine torque.

8. The method of claim 7, wherein the preferred CVT input deceleration profile comprises an initial CVT input deceleration, a maximum CVT input deceleration and a final CVT input deceleration, an initial-to-maximum CVT input deceleration time, a maximum CVT input deceleration time, and a maximum-to-final CVT input deceleration time that are determined to achieve the desired variator speed ratio within the preferred shift time when starting at an initial variator speed ratio.

9. The method of claim 7, wherein controlling the CVT in response to the change rate for the variator speed ratio and the desired variator speed ratio comprises controlling a CVT primary pressure command and a CVT secondary pressure command in response to the change rate for the variator speed ratio and the desired variator speed ratio.

10. The method of claim 7, wherein the variator comprises a chain-drive variator including first and second pulleys rotatably coupled via a rotatable device and a first actuator operably connected to a moveable sheave of the first pulley and a second actuator operably connected to a moveable sheave of the second pulley; and wherein controlling the CVT in response to the change rate for the variator speed ratio and the desired variator speed ratio comprises controlling a CVT primary pressure command to control an axial position of the moveable sheave of the first pulley and controlling a CVT secondary pressure command to control an axial position of the moveable sheave of the second pulley in response to the change rate for the variator speed ratio and the desired variator speed ratio.

11. The method of claim 7, wherein determining a desired variator speed ratio responsive to an operator input comprises determining the desired variator speed ratio in response to an operator tip-in to an accelerator pedal.

12. The method of claim 7, wherein determining a desired variator speed ratio responsive to an operator input comprises determining the desired variator speed ratio in response to an operator tap-up command to a transmission gear selector.

13. The method of claim 7, wherein executing the step-upshift in the CVT based upon the desired variator speed ratio further comprises:
  unlocking a clutch of the torque converter, and
  controlling the internal combustion engine in response to the engine torque control, wherein the engine torque control is determined based upon an inertial torque related to a torque converter operating point, the CVT input deceleration profile and a torque converter speed ratio.

14. A powertrain system, comprising:
  an internal combustion engine rotatably coupled to a variator of a continuously variable transmission (CVT) via a torque converter;
  a controller operatively connected to the internal combustion engine, the CVT and the torque converter and in communication with an accelerator pedal and a transmission gear selector, the controller including an instruction set, the instruction set executable to:
    determine a desired variator speed ratio responsive to operator input to either the accelerator pedal or the transmission gear selector,
    unlock a clutch of the torque converter,
    determine parameters for executing a step-upshift in the CVT based upon the desired variator speed ratio, including a desired CVT input speed profile and a preferred CVT input deceleration profile determined based upon the desired variator speed ratio, an initial CVT input speed and a target CVT input speed, and a change rate for the variator speed ratio based upon the preferred CVT input deceleration profile synchronized with the engine torque control,
    synchronize the preferred CVT input deceleration profile with a command to decrease engine torque, and
    execute the step-upshift in the CVT based upon the desired variator speed ratio, including control the CVT in response to the change rate for the variator speed ratio and the desired variator speed ratio, and control the internal combustion engine in response to the engine torque control.

\* \* \* \* \*